UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

SOLVENT FOR ACETYL CELLULOSE.

1,143,979.   Specification of Letters Patent.   Patented June 22, 1915.

No Drawing.   Application filed May 23, 1912.   Serial No. 699,235.

*To all whom it may concern:*

Be it known that I, WILLIAM G. LINDSAY, a citizen of the United States, residing in Caldwell, county of Essex, State of New Jersey, have invented certain new and useful Improvements in Solvents for Acetyl Cellulose, of which the following is a specification.

The various compositions to which the present invention relates are employed in the arts, sometimes as imitations of natural substances and sometimes as films which are used for photographic purposes. Although the final or useful form of the different compounds of acetyl cellulose is that of a solid or dry material, the different processes of conversion into this final solid form involve, as is well understood, the employment of solutions or mixtures of varying consistencies as to elasticity, stiffness or fluidity, depending generally upon the proportion or kind of solvent used to the amount of the original base—acetyl cellulose.

In the treatment of acetyl cellulose for the production of solutions for the manufacture of lacquers, varnishes, photographic films, and flexible or plastic compounds, I have discovered that a mixture of ethyl acetate and methyl alcohol constitutes a solvent of that variety of acetyl cellulose which is freely soluble in acetone.

It is well known that ethyl acetate or acetic ether has been proposed as a solvent for the acetone-soluble variety of acetyl cellulose and that the ethyl acetate found on the market contains varying amounts of ethyl alcohol. I have discovered, however, that when the commercial or the 100% ethyl acetate is diluted with methyl alcohol in certain proportions the mixture exerts an increased solvent action on the acetyl cellulose of the variety described for the preparation of acetyl cellulose plastics.

The best proportions I have found are 30% to 40% of methyl alcohol mixed with 60% to 70% of ethyl acetate, and one example of practising my invention is as follows:—To 100 parts, by weight, of the acetone-soluble variety of acetyl cellulose I add 10 to 20 parts, by weight, of paraethyltoluolsulphonamid and 20 to 30 parts of triphenyl phosphate. I incorporate these solid ingredients thoroughly by mechanical stirring and add to the mixture thus obtained from 60 to 70 parts, by weight, of a mixture composed of 70 parts, by volume, of ethyl acetate and 30 parts, by volume, of methyl alcohol. The mass is then thoroughly incorporated by suitable malaxating or kneading and when a uniform mixture is obtained the excess of solvent is allowed to evaporate and the dough-like product thus obtained is further worked up according to the method which is well known in the manufacture of nitro-cellulose-camphor compounds.

Having thus described my invention, what I claim is:—

A solvent for acetyl cellulose of that variety which is freely soluble in acetone comprising 60 to 70 parts by volume of ethyl acetate and 30 to 40 parts by volume of methyl alcohol, substantially as described.

WILLIAM G. LINDSAY.

Witnesses:
RUTH MEYERSON,
J. E. HINDON HYDE.